Jan. 1, 1952　　　　　W. H. GILLE　　　　　2,580,759
LIQUID LEVEL RESPONSIVE SWITCH

Filed April 9, 1949

INVENTOR.
WILLIS H. GILLE
BY
George H Fisher
ATTORNEY

Patented Jan. 1, 1952

2,580,759

UNITED STATES PATENT OFFICE 2,580,759

LIQUID LEVEL RESPONSIVE SWITCH

Willis H. Gille, St. Paul, Minn., assignor to Minneapolis-Honeywell Regulator Company, Minneapolis, Minn., a corporation of Delaware Application April 9, 1949, Serial No. 86,556

2 Claims. (Cl. 200—84)

This invention is directed to liquid level responsive devices and more particularly to a float switch designed primarily for use in a steam boiler.

Many liquid level responsive devices have been devised that operate satisfactorily in various liquids other than boiler water. Boiler water contains impurities that precipitate as the water is heated boils. Probably the most troublesome impurity is lime which forms as a relatively hard layer on surfaces within the boiler. If a metal bellows is used as a flexible pressure seal between the boiler wall and the float mechanism, the convolutions of the bellows will eventually fill with lime rendering the device inoperative. Other known types of liquid level responsive device also will fail eventually due to lime accumulation.

The principal object of the present invention is to provide a pivotal mechanical connection between a stationary support and a movable float that is not subject to lime accumulation and that also serves to transmit an indication of float position to the stationary support and thence to an outside circuit.

A more specific object is to provide a float actuated switch having a gravity actuated switch attached to the float and movable therewith within the liquid container, the pivotal connection for the float comprising a pair of flexible electrical conductors that also serve as the electrical connection to the switch. This construction prevents lime accumulation from interfering with float movement because flexing of the conductors breaks away the lime if more than a very thin layer should form.

Figure 1:
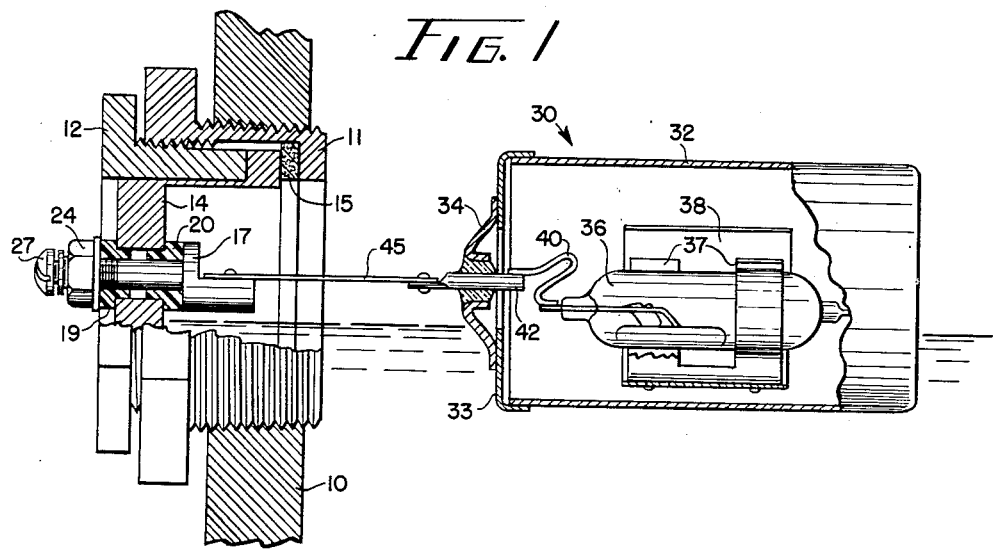
Figure 2:
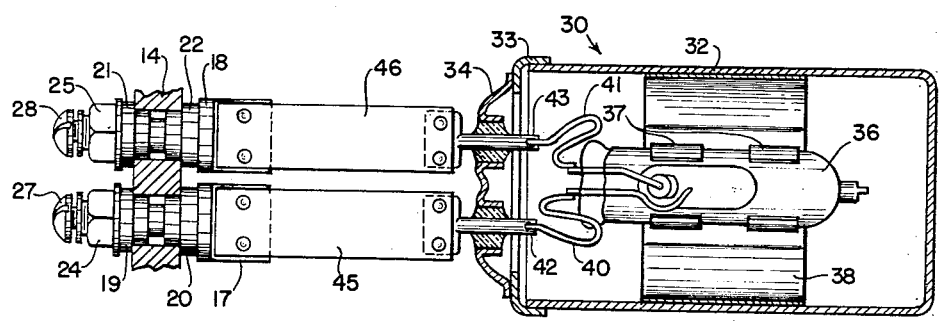
Figure 4:
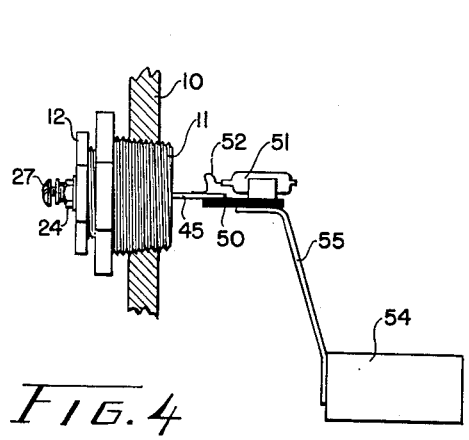
Figure 3:
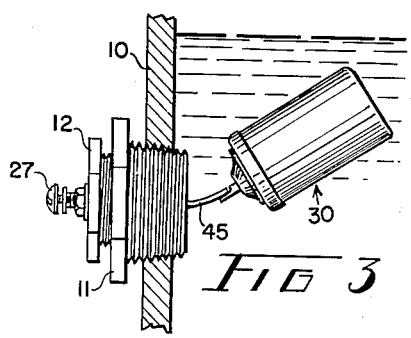

Other objects will be evident from the following written description and claims and from the drawing in which Figure 1 is a sectional elevation of a float switch illustrating a preferred embodiment of the invention, Figure 2 is a sectional plan of the device shown in Figure 1, Figure 3 shows the position of the float when covered by liquid, and Figure 4 shows a slightly modified form of the invention.

The float switch to be described is of the type adapted to open a circuit on fall in liquid level and therefore is suitable for use as a low water cutoff. It may be connected in series with an oil burner motor, stoker motor or other device used to supply fuel to a boiler and prevent firing when the boiler water is below a safe level. Controls of this type are usually mounted on boilers in one of two ways. Either the float is mounted in a separate container which is connected by suitable pipes to the boiler, or is inserted directly into the boiler itself. For simplicity the present invention will be described in connection with an insertion low water cutoff which is screwed directly into the boiler wall.

In Figures 1 and 2 of the drawing a float switch is illustrated in which a mercury switch is carried within the float. A portion of a boiler wall 10 is shown in section in Figure 1. An opening in this wall is threaded to receive a plug 11 which is also suitably threaded so that it may be tightened into the wall 10 to provide a pressure tight seal therewith. The plug 11 is also screw-threaded internally to receive complementary screw threads on a second plug 12, the inner end of which engages an annular flange on a cup-shaped member 14. An annular gasket 15 is disposed between the flange on the cup-shaped member 14 and an inwardly extending annular flange on the plug 11, the arrangement being such that tightening the plug 12 in the plug 11 compresses the gasket 15 between the plugs 11 and 12 to form a pressure-tight seal. This construction enables the outer plug 11 to be tightened in the boiler wall 10 without regard to proper leveling of the cup-shaped member 14. The cup-shaped member 14 may be arranged at the proper angle with respect to the boiler wall and the plug 12 tightened to obtain the required pressure-tight seal.

A pair of electrically conducting bolts 17 and 18 extend through adjacent openings in the member 14 and are insulated therefrom by means of bushings 19, 20 and 21, 22 which may be of suitable rubber-like composition unaffected by boiler temperature. The bolts 17 and 18 are secured in place by a pair of nuts 24 and 25. The outer ends of the bolts are tapped to receive terminal screws 27 and 28 to which external electrical connections may be made to the float switch.

A float 30, of a diameter smaller than the tapped opening in the boiler wall 10, is disposed within the boiler and is adapted to rise and fall in accordance with rise and fall of boiler water level. The float 30 may consist of a cup-shaped metal can 32, the open end of which is closed by a cover 33 and by a member 34 which forms a portion of a pressure seal as will be described below. The joints between the cover 33 and the can 32 and the joint between the member 34 and the cover 33 may be formed by hard solder or by any other suitable means adapted to provide a hermetic seal. A mercury switch 36, which may be of the conventional glass envelope type, is carried within the float 30 on a spring clip 37 which, in turn, is secured to the interior of can 32 on a bracket 38. While the mercury switch is shown as being one having a straight cylindrical glass envelope, other types could be substituted, for instance, one having an envelope that is high in the middle for the purpose of obtaining a somewhat wider operating differential. The terminal wires extending from the mercury switch are connected by wires 40 and 41 to a pair of rigid conductors 42 and 43 which extend outwardly through openings in the member 34. The annular space between the conductors 42 and 43 and the member 34 are filled with glass for the purpose of effecting a hermetic seal. Both the conductors 42 and 43 and the member 34 are of a material having a coefficient of expansion corresponding to the glass which fills the space therebetween so that changes in temperature will not fracture the glass. The member 34 is shaped so that differences in expansion between the cover 33 and the member 34 will not be transmitted to the glass.

The outer end of the conducting member 42 is connected to the bolt 17 by a flexible metal strip 45, and the outer end of the conductor 43 is connected to the bolt 18 by a flexible metal strip 46. The strips 45 and 46 may be attached to the corresponding members at either end by any suitable method such as riveting or spot welding. It will be seen that when the float is in a raised position it will be inclined to cause the mercury switch to close its circuit to complete an electrical circuit from the terminal screw 27 through the bolt 17, the strip 45, conducting member 42, the wire 40, the mercury switch 36, the wire 41, the conducting member 43, the strip 46, and the bolt 18 to the terminal screw 28. If the level of water within the boiler should drop from the position shown in Figure 1, the mercury will leave the mercury switch electrodes and the circuit will be broken. The strips 45 and 46 are preferably resilient and will not be permanently deformed by rise and fall of the float. It will be evident that the strips 45 and 46 serve as a pivotal mechanical connection between the float 30 and the bolts 17 and 18 which are, of course, fixed with respect to the boiler wall.

Since the strips 45 and 46 and the inner end of the bolts 17 and 18 together with the outer portions of the connecting members 42 and 43 are exposed within the boiler it is desirable to provide suitable electrical insulation thereon. While it would be possible to coat these members with a thin layer of insulating material it has been found that a simpler and more desirable method is to form these members of a metal on which an insulating oxide coating may be formed. Aluminum may be given an anodized finish which effectively insulates its surface and fulfills the electrical requirement, but this metal is somewhat soft to supply the mechanical requirements of the reeds 45 and 46. It has been found that tantalum will also take an anodized finish and in addition has somewhat superior mechanical properties. Hence, it is desirable to form at least the reeds 45 and 46 of tantalum. This anodized insulating coating is self-healing so that if a portion of it should be removed for any reason it will reform. This self-healing action will occur, in the case of a boiler water level control, whenever an exposed portion of a reed has sufficient water in contact therewith to act as an electrolyte. If the device is connected in an alternating current circuit the exposed portion will act as an anode during half of each cycle assuming a potential difference exists. Thus, the insulating coating will reform when ever there is a need for insulation. Solids precipitated from boiler water have less tendency to adhere to an anodized surface than to other otherwise suitable insulating layers known to the inventor, at least in the present instance where the reeds are subjected to more or less continual flexing during boiler operation.

The overall density of the float 30 is preferably slightly less than half that of the liquid in which it floats. Thus, if a layer of lime deposits on the float surface its density would not be increased to appreciably more than half that of an equal volume of the liquid. Hence, the upward force on the strips 45 and 46 caused by the float 30 being entirely immersed in water will be approximately equal to the downward force on the strip that would occur if the float is entirely out of water.

As previously stated the strips 45 and 46 serve as pivotal mechanical connections for the float 30. On normal minor variations in water level the float will rise and fall between positions in which the mercury switch 36 is in circuit closed position. However, if the water level should fall below the position shown in Figure 1, the mercury switch will open a circuit and hence open the circuit between the terminal screws 27 and 28. The strips 45 and 46 act as leaf springs that bias the float toward one position, such as the position shown in Figure 1. As the water level rises above or below this position the strips 45 and 46 will tend to limit the travel of the float by an amount depending on the spring rate of the strips. Preferably, the combined spring rate of the strips 45 and 46 is such that no portion of the strips or of the floats 30 will touch the boiler wall or the plug 11 even though the water level should rise entirely above or drop entirely below the float. Figure 3 shows the position in which the float 30 will be held by the strips 45 and 46 when the water level is so high as to totally submerge the float. However, the spring rate of the strips should not be so high that the float will not adequately respond to changes in water level to actuate the switch. Also, the strips 45 and 46 must be sufficiently strong so that the float can assume the extreme position without exceeding or coming dangerously close to the elastic limits of the strips. It is of course desirable that the strips return to their original form when the water level is within normal limits.

It would, of course, be possible to limit float travel by stops which engage the float should it travel an excessive amount in either an upward or downward direction. Such stops would introduce the possibility that if the water level should be outside the normal limits for an extended period of time the float would become cemented by precipitated impurities of the boiler water to one or the other of the stops. This condition would be especially dangerous if the boiler water level was excessively high for some time and then should be reduced below a safe level. Should the float become cemented to the upper stop it could not, obviously, perform its intended function.

By limiting upward movement of the float 30 by the resilience of the strips 45 and 46 the float would never be entirely stationary even when the water level is excessively high because surging of the water during boiling would cause some movement of the float. Under this condition, strips 45 and 46 will be continually flexing and hence no appreciable layer of lime will be deposited on the strips. The same condition of course exists during operation of the boiler at normal boiling water levels. Flexing of the strips 45 and 46 will prevent the formation of any more than a very thin layer of lime thereon and float movement will not be impaired.

Figure 4 shows a modification of the invention which is similar to that disclosed in Figures 1 and 2 with the exception that the mercury switch is not located within the float. The flexible strips 45 and 46 may be supported with respect to the boiler wall in the same manner as discussed in connection with Figures 1 and 2. Here, however, the outer ends of the strips are secured to an insulating strip 50 which carries a mercury switch 51. The mercury switch lead wires 52 are secured directly to the strips 45 and 46. A float 54 is secured to the insulating strip 50 by a member 55. Raising and lowering of the float 54 due to changes in water level transmits similar angular movements to the member 55, to the insulating strip and to the switch 51. The flexible conducting strips 45 and 46 serve as a pivotal mechanical mounting for the float 54 and switch 51 as well as the electrical connection to the switch 51 in the same manner as discussed above. This construction places the mechanical pivot means and the electrical connections well above the surface of the boiler water and therefore minimizes formation of lime thereon.

Various other modifications of the invention will appear to those skilled in the art. As an example, it would not be necessary that the strips 45 and 46 be flat as described above; they could be circular wires or rods of the required flexibility. It would be possible to obtain the same result if only one resilient connection is relied on to guide movements of the float, the other connection being merely a flexible electrical connection. Also it might be desired to employ a flexible coaxial cable between the boiler wall and the float.

A pressure-tight seal such as shown in connection with Figures 1 and 2 between the float wall and the conducting members 42 and 43 could be employed between the cup-shaped member 14 and the conducting members leading to the outside of the boiler. Another modification might involve the use of the mercury switch envelope itself as the float. In this case, if desired, the mercury switch leads themselves might extend from the switch casing to the support at the boiler wall or might even extend through the boiler wall to the external electrical connections. In order to minimize the requirement for electrical insulation on the exposed conductors the switch could be placed in control of a very low voltage relay circuit so that the potential between the strips 45 and 46 would never exceed, for example, one volt.

By reversing the mercury switch it would be possible to have the device close its circuit on a fall in water level and adapt the device to control a feed water valve, or a double throw switch could be used to control a feed water or alarm circuit in addition to the low water cutoff arrangement shown. Likewise, other forms of gravity actuated switches might be substituted for the mercury switch.

The scope of the invention is to be limited only by the appended claims.

I claim as my invention:

1. A liquid level responsive device comprising a supporting member having a mounting portion adapted to engage a vertical wall of a liquid container at an opening therein, said member having a recess therein facing the container when applied thereto, a float, a gravity actuated switch carried by said float, a pair of electrical conductors extending through said member and terminating within the recess, means insulating said conductors from said member and supporting said conductors with respect thereto, two resilient electrically conducting elements interconnecting said float and the portion of said conductors within said recess, the connections between said elements and said conductors being so located in the recess with respect to the mounting portion of said member that a portion of the free lengths of said elements extends outwardly beyond the inner surface of the container wall, said elements serving as a pivotal mechanical connection between said member and said float and as electrical connections between said conductors and said switch, and said elements further having a spring rate such that changes of liquid level within the container can change the angle of said float sufficiently to actuate said switch but cannot cause sufficient movement of said float to bring said elements or said float into engagement with either said member or the wall of the container.

2. A liquid level responsive device comprising, a supporting member having a mounting portion adapted to engage a vertical wall of a liquid container at an opening therein, said member having a generally cylindrical portion disposed with respect to said mounting portion to extend inwardly of the container from the outer surface thereof, said member having a recess therein facing the container when applied thereto and extending outwardly from the inner end of said cylindrical portion, a float, a gravity actuated switch carried by said float, a pair of electrical conductors extending through said member and terminating within the recess, means insulating said conductors from said member and supporting said conductors with respect thereto, two resilient electrically conducting elements interconnecting said float and the portion of said conductors within said recess, the connections between said elements and said conductors being so located in the recess with respect to the mounting portion of said member that one portion of the free lengths of said elements extends outwardly beyond the outer surface of the container wall and another portion of the free lengths of said elements extends inwardly beyond the end of said cylindrical portion, said elements serving as a pivotal mechanical connection between said member and said float and as electrical connections between said conductors and said switch, and said elements further having a spring rate such that changes of liquid level within the container can change the angle of said float sufficiently to actuate said switch but cannot cause sufficient movement of said float to bring said elements into engagement with said cylindrical portion of said member.

WILLIS H. GILLE.

REFERENCES CITED

The following references are of record in the file of this patent:

UNITED STATES PATENTS

| Number | Name | Date |
| --- | --- | --- |
| 842,082 | Clayton | Jan. 22, 1907 |
| 1,952,897 | Spencer | Mar. 27, 1934 |
| 2,174,841 | Robinson | Oct. 3, 1939 |
| 2,214,876 | Clark | Sept. 17, 1940 |
| 2,244,131 | Van Norstrand | June 3, 1941 |
| 2,420,177 | Krall | May 6, 1947 |